United States Patent
Xue et al.

(10) Patent No.: US 12,316,891 B2
(45) Date of Patent: May 27, 2025

(54) VIDEO GENERATING METHOD AND APPARATUS, ELECTRONIC DEVICE, AND READABLE STORAGE MEDIUM

(71) Applicant: Lemon Inc., Grand Cayman (KY)

(72) Inventors: Yufan Xue, Beijing (CN); Jie He, Beijing (CN); Ye Yuan, Los Angeles, CA (US); Xiaojie Li, Los Angeles, CA (US); Yue Gao, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/757,292

(22) Filed: Jun. 27, 2024

(65) Prior Publication Data
US 2024/0348846 A1    Oct. 17, 2024

Related U.S. Application Data

(63) Continuation of application No. PCT/SG2022/050946, filed on Dec. 29, 2022.

(30) Foreign Application Priority Data

Dec. 31, 2021    (CN) .......................... 202111672927.6

(51) Int. Cl.
*H04N 21/23* (2011.01)
*H04N 21/234* (2011.01)
(Continued)

(52) U.S. Cl.
CPC ... *H04N 21/2368* (2013.01); *H04N 21/23418* (2013.01); *H04N 21/23424* (2013.01); *H04N 21/4394* (2013.01); *H04N 21/8113* (2013.01)

(58) Field of Classification Search
None
See application file for complete search history.

(56) References Cited

U.S. PATENT DOCUMENTS

| | | | |
|---|---|---|---|
| 9,848,228 B1 | 12/2017 | Morris et al. | |
| 2022/0148622 A1 | 5/2022 | Chen | |
| 2022/0358966 A1* | 11/2022 | Wang | ................. H04N 21/8106 |

FOREIGN PATENT DOCUMENTS

| | | |
|---|---|---|
| CN | 110225409 A | 9/2019 |
| CN | 110519638 A | 11/2019 |

(Continued)

OTHER PUBLICATIONS

China National Intellectual Property Administration, Office Action and Search Report Issued in Application No. 202111672927.6, Apr. 16, 2023, 16 pages.

(Continued)

*Primary Examiner* — Cai Y Chen
(74) *Attorney, Agent, or Firm* — Alleman Hall & Tuttle LLP

(57) ABSTRACT

A video generating method includes acquiring video materials from an initial collection which comprises user-related videos, acquiring a target audio material serving as background music, performing image feature extraction on video frames of each video material, and performing segmentation processing according to image feature information corresponding to each video frame to acquire a target video segment corresponding to the video material, and merging the target video segment and the corresponding target audio material to generate a target video. The target video includes video segments which are obtained based on the target video segments respectively, the video segments in the target video are played in order of post time, and time lengths of the video segments are matched with time lengths of corresponding musical phrases in the target audio material.

17 Claims, 5 Drawing Sheets

(51) Int. Cl.
*H04N 21/2368* (2011.01)
*H04N 21/439* (2011.01)
*H04N 21/81* (2011.01)

(56) References Cited

FOREIGN PATENT DOCUMENTS

| | | | |
|---|---|---|---|
| CN | 110602552 | A | 12/2019 |
| CN | 111683209 | A | 9/2020 |
| CN | 111741233 | A | 10/2020 |
| CN | 111866585 | A | 10/2020 |
| CN | 112235631 | A | 1/2021 |
| CN | 113423005 | A | 9/2021 |
| CN | 113676772 | A | 11/2021 |
| JP | 2005175630 | A | 6/2005 |
| JP | 2016039547 | A | 3/2016 |
| WO | 2021259322 | A1 | 12/2021 |

OTHER PUBLICATIONS

China National Intellectual Property Administration, Office Action and Search Report Issued in Application No. 202111672927.6, Sep. 29, 2023, 16 pages.

ISA Intellectual Property Office of Singapore, International Search Report Issued in Application No. PCT/SG2022/050946, Sep. 8, 2023, WIPO, 9 pages.

Luan, X. et al., "Movie summarization method based on audio-visual feature fusion," Application Research of Computers, vol. 34, No. 1, Jan. 2017, 3 pages. Contains English abstract.

Shin, K. et al., "Music Synchronization with Video Using Emotion Similarity," Proceedings of the 2017 IEEE International Conference on Big Data and Smart Computing (BigComp 2017), Feb. 13, 2017, Jeju Island, Korea, 4 pages.

Wang, C. et al., "Event-oriented Film Abstract," Journal of Image and Graphics, vol. 10, No. 5, May 2005, 8 pages. Contains English abstract.

Wen, J. et al., "News Video Story Segmentation Method Using Fusion of Multi-modal Features," Journal of Chinese Computer Systems, vol. 29, No. 1, Jan. 2008, 4 pages. Contains English abstract.

Japan Patent Office, Notice of Reasons for Refusal for Japanese Application No. 2024-539569, mailed Nov. 26, 2024, 9 pages.

* cited by examiner

VIDEO GENERATING METHOD AND APPARATUS, ELECTRONIC DEVICE, AND READABLE STORAGE MEDIUM

CROSS-REFERENCE TO RELATED APPLICATIONS

The present application is a continuation application of International Application No. PCT/SG2022/050946, filed on Dec. 29, 2022, which claims priority to Chinese Patent Application No. 202111672927.6, entitled "VIDEO GENERATING METHOD AND APPARATUS, ELECTRONIC DEVICE, AND READABLE STORAGE MEDIUM" and filed on Dec. 31, 2021. The disclosures of both applications are incorporated by reference herein in their entireties.

TECHNICAL FIELD

The present disclosure relates to the field of video processing techniques, and in particular to a video generating method and apparatus, an electronic device, and a readable storage medium.

BACKGROUND

The videos that have been posted by a user within a past time period are merged to generate one video, and the user can awaken some profound memories in the process of watching the generated video. Therefore, videos with a retrospective theme are deeply loved by the user.

SUMMARY

The present disclosure provides a video generating method and apparatus, an electronic device and a readable storage medium.

In a first aspect, the present disclosure provides a video generating method, including:
  acquiring a plurality of video materials from an initial video material collection which comprises user-related videos;
  acquiring a target audio material serving as background music;
  for each of the video materials, performing image feature extraction on video frames of the video material respectively, and performing segmentation processing according to image feature information corresponding to the video frames of the video material respectively to acquire a target video segment corresponding to the video material;
  merging the target video segments corresponding to each of the video materials respectively and the target audio material to generate a target video; the target video comprises a plurality of video segments which are obtained based on the plurality of target video segments respectively, the plurality of video segments in the target video are played in order of post time, and time lengths of the plurality of video segments are matched with time lengths of corresponding musical phrases in the target audio material.

As one possible implementation, the acquiring a target audio material serving as background music includes:
  determining a target audio material from a preset audio material collection according to an audio feature of each audio material in the preset audio material collection, beat information of the audio material, and a time length of each musical phrase of a particular audio segment in the audio material, wherein the particular audio segment in the target audio material is background music of the target video.

As one possible implementation, the determining a target audio material from a preset audio material collection according to an audio feature of each audio material in the preset audio material collection, beat information of the audio material, and a time length of each musical phrase of a particular audio segment in the audio material includes:
  performing exclusion on a plurality of music materials comprised in a preset music material collection according to a preset music feature collection to acquire a first candidate audio material collection;
  performing exclusion on each of the audio materials comprised in the first candidate audio material collection according to a preset audio beat to acquire a second candidate audio material collection;
  determining the target audio material according to an audio material, in which time length of each musical phrase comprised in the particular audio segment meets a preset time length condition, in the second candidate audio material collection.

As one possible implementation, if there is no audio material, in which the time length of the musical phrase in the particular audio segment meets a preset time length condition, in the second candidate audio material collection, the method further includes:
  matching with an audio feature corresponding to each of audio materials in a pre-assigned audio material collection respectively according to preference of the user, and if the matching is successful, determining the target audio material according to the successfully matched audio material.

As one possible implementation, the method further includes:
  for each of the video materials, performing a weighting calculation on image feature information corresponding to the frames of the video material respectively, to acquire evaluation results corresponding to the video frames respectively;
  extracting a target video frame from the video frames of the video material according to the evaluation results corresponding to the video frames respectively to acquire a video frame collection, wherein the video frame collection comprises a plurality of target video frames extracted from the plurality of video materials, and the video frame collection is used for generating an opening and/or ending of the target video;
  the merging the target video segments corresponding to each of the video materials respectively and the target audio material to generating a target video including:
  merging target video segments corresponding to each of the video materials respectively, the video frame collection, and the target audio material to generate the target video which comprises an opening and/or end generated according to the video frame collection.

As one possible implementation, the performing segmentation processing according to image feature information corresponding to the video frames of the video material respectively to acquire a target video segment includes:
  performing segmentation processing on the video material according to image feature information corresponding to the video frames of the video material respectively, a time length of a corresponding musical phrase in the target audio segment, and a sentence segmentation result of the initial audio in the video material, to acquire the target video segment.

As one possible implementation, the target audio segment includes one or more complete sentences in the corresponding initial audio.

In a second aspect, the present disclosure provides a video generating apparatus, including:
- a video processing module for acquiring a plurality of video materials from an initial video material collection which comprises user-related videos;
- an audio processing module for acquiring a target audio material serving as background music;
- wherein the video processing module is further used for performing, for each of the video materials, image feature extraction on video frames of the video material respectively, and performing segmentation processing according to image feature information corresponding to the video frames of the video material respectively to acquire a target video segment corresponding to the video material;
- a video merging module for merging the plurality of target video segments and the target audio material to generate a target video; wherein the target video comprises a plurality of video segments which are obtained based on the plurality of target video segments respectively, the plurality of video segments in the target video are played in order of post time, and time lengths of the plurality of video segments are matched with time lengths of corresponding musical phrases in the target audio material.

In a third aspect, the present disclosure provides an electronic device including: a memory and a processor;
- wherein the memory is configured to store computer program instructions;
- wherein the processor is configured to execute the computer program instructions to cause the electronic device to implement the video generating method according to any one of the first aspect.

In a fourth aspect, the present disclosure provides a readable storage medium comprising: computer program instructions which, when being executed by at least one processor of an electronic device, cause the electronic device to implement the video generating method according to any one of the first aspect.

In a fifth aspect, the present disclosure provides a computer program product which, when being executed by a computer, causes the computer to implement the video generating method according to any one of the first aspect.

In a sixth aspect, the present disclosure provides a computer program which, when being executed by a computer, causes the computer to implement the video generating method according to any one of the first aspect.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

In order to more clearly illustrate the technical solutions in the embodiments or the prior art of the present disclosure, the drawings used in the embodiments or the prior art will be briefly described below, and it is obvious for those skilled in the art that other drawings can be obtained according to these drawings without inventive effort.

DETAILED DESCRIPTION

In order that the above objects, features and advantages of the present disclosure may be more clearly understood, solutions of the present disclosure will be further described below. It should be noted that, in the case of no conflict, the embodiments and features in the embodiments of the present disclosure may be combined with each other.

In the following description, numerous specific details are set forth in order to provide a thorough understanding of the present disclosure, but the present disclosure may be implemented otherwise than as described herein. Obviously, the embodiments in the specification are only a part of embodiments of the present disclosure, and not all embodiments.

Currently, a video analysis algorithm will be usually used to select a part of video segments from videos posted by a user within a certain time period, and then these selected video segments are merged to generate a video on the retrospective theme. However, the above process is limited to how to select video segments, which results in that the generated video is not vivid overall and brings the user a feeling which is below expectation, and is thus a problem to be urgently solved is how to generate a more vivid video on the retrospective theme.

The present disclosure provides a video generating method and apparatus, an electronic device, and a readable storage medium. According to the method, by selecting a plurality of video materials from video materials posted by the user within a preset time period, extracting some target video segments from the selected plurality of video materials, merging the extracted target video segments with the determined target audio segment thereby to generate a target video corresponding to the preset time period, so that the user can review profound memories within the preset time period through the target video; matching a time length of each video segment in the target video with a time length of a musical phrase in the adopted target audio segment so that a content tempo of the target video is matched with an audio tempo, a unique experience and feeling can be brought to the user.

Figure 1:
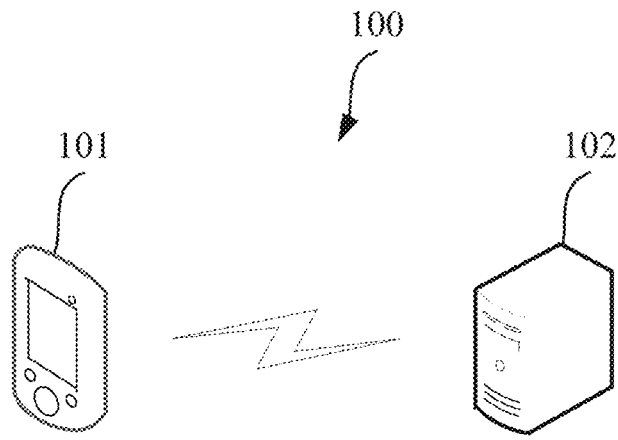
FIG. 1 is an application scenario diagram of a video generating method provided by an embodiment of the present disclosure.

FIG. 1 is a schematic diagram of a scenario of a video generating method provided by the present disclosure. A scenario 100 shown in FIG. 1 includes: a terminal device 101 and a server device 102, wherein a client is installed on the terminal device 101, and the client can communicate with the server device 102 through the terminal device 101.

The client can present to a user an entry for acquiring a target video through the terminal device 101, and generate an operation instruction based on a trigger operation of the user for the entry. Then, the client can generate a video acquisition request according to the operation instruction, and send the video acquisition request to the server device through the terminal device 101. the server device 102 can distribute to the client a target video corresponding to a preset time period in response to the video acquisition request sent by the client through the terminal device 101. After receiving the target video, the client can load the target video, display a video editing page through the terminal device 101, and play and present the target video in the video editing page. The user can make some adjustments on the video through the video editing page, for example, changing the soundtrack of the target video.

The server device 102 can select a plurality of video materials from a plurality of user-related videos, extract some target video segments from the selected plurality of video materials, determine a target audio material serving as background music, and merge the extracted target video segments with the target audio material, thereby to generate a target video. Since the server device 102 can pre-generate the target video offline, the server device 102 can quickly respond to the video acquisition request upon receiving a video acquisition request sent by the client, thereby ensuring user experience.

It should be noted that, in addition to the above scenario shown in FIG. 1, the video generating method provided by the present disclosure can also be executed locally by the terminal device. For example, the client can pre-select a plurality of video materials from user-related videos by using resources of the terminal device, extract some target video segments from the selected plurality of video materials, and buffer both the extracted target video segments and the determined target audio segments locally on the terminal device; when the client receives a video acquisition request input by the user, merge a plurality of target video segments with a target audio material, to generate a target video. In this manner, the client can process the video material and the audio material by using the resources of the terminal device within an idle time period. The target audio material can be pre-acquired by the terminal device from the server device, or can be acquired from the server device when the video acquisition request input by the user is received.

Certainly, the video generating method provided by the present disclosure can also be implemented in other manners, which are not described herein in detail.

Illustratively, the video generating method provided by the present disclosure can be executed by the video generating apparatus provided by the present disclosure, and the video generating apparatus can be implemented by means of any software and/or hardware. Illustratively, the video generating apparatus can be a mobile phone, a tablet computer, a notebook computer, a palm top computer, a vehicle-mounted terminal, a wearable device, an ultra-mobile personal computer (UMPC), a netbook or a personal digital assistant (PDA), a personal computer (PC), a server, a cloud server, a server cluster, or the like. The specific type of the video generating apparatus is not specifically limited in the embodiments of the present disclosure.

In the following embodiment, details are described by taking an example in which an electronic device executes a video generating method.

Figure 2:
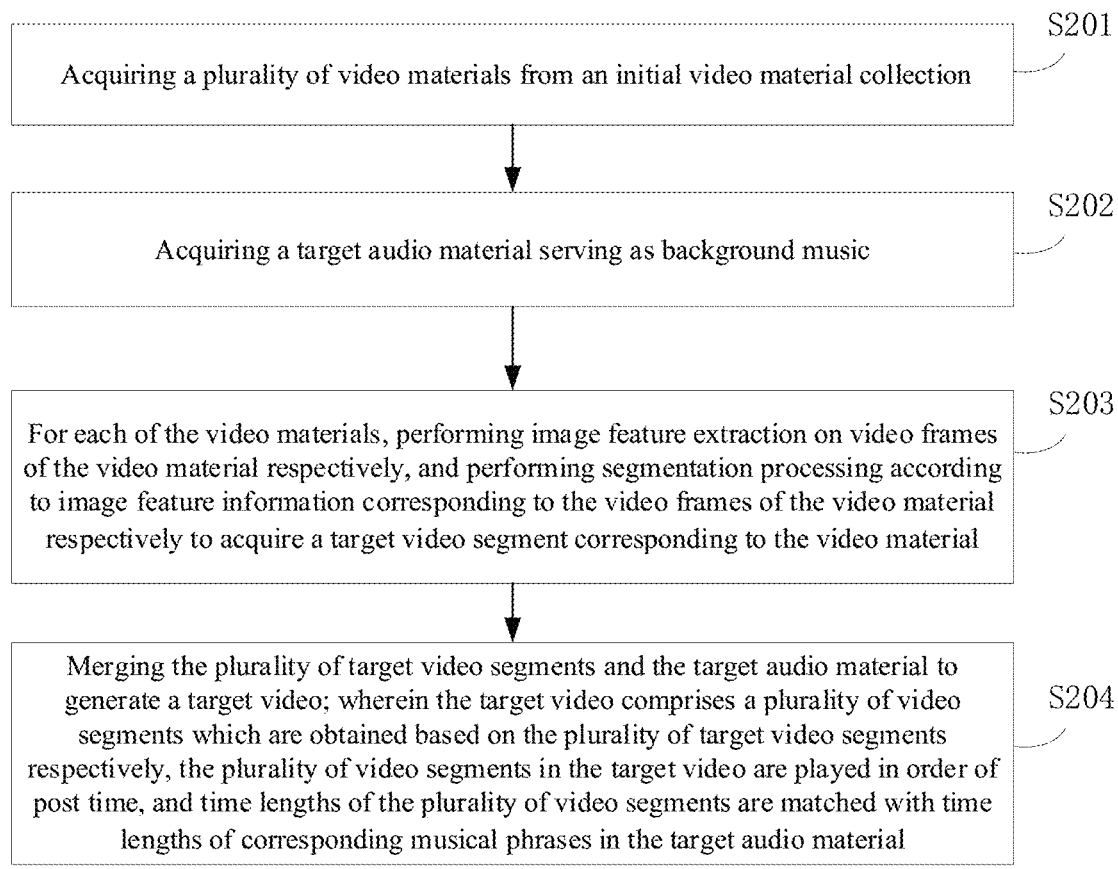
FIG. 2 is a schematic flow diagram of a video generating method provided by one embodiment of the present disclosure.

FIG. 2 is a flow diagram of a video generating method provided by one embodiment of the present disclosure. Referring to FIG. 2, the method of the present embodiment includes:

S201, acquiring a plurality of video materials from an initial video material collection.

The initial video material collection can include user-related videos, and the plurality of video materials selected from the initial video material collection are used for generating a target video corresponding to the user. The user-related videos can include, but are not limited to: videos posted by the user, videos edited by the user but not posted (e.g., videos stored in a draft box), videos exported by the user, and the like. Alternatively, the user-related videos can also be time-related, that is, the initial video material collection includes videos that are user-related and that meet a particular time condition, for example, the initial video material collection can include videos posted by the user in the past year, videos taken in the past year, videos clipped in the past year, and the like.

In the following embodiment, an example is given for illustrations in which the initial video material collection includes videos that are posted within a preset time period.

Assuming that the electronic device is a server device, the server device can acquire video materials posted by a user within a preset time period from a database for storing the video materials posted by the user. Assuming that the electronic device is a terminal device, the client can generally buffer, in a local storage space of the terminal device, video materials already posted by the user, video materials not posted in a draft box, video materials downloaded by the user, and the like. Therefore, the electronic device can also acquire, from the local storage space of the terminal device, the video materials posted by the user within a preset time period.

The present disclosure makes no limitation on a specific time length of the preset time period, for example, the preset time period can be one year, half year, one quarter, or the like.

The plurality of video materials determined by the electronic device are video materials in the plurality of video materials posted by a user within a preset time length which meet a particular condition, and the selected video materials have high possibility of including the user's meaningful memories within a preset time period. The particular condition for selecting the video materials can be related to information of the video materials in a first dimension which can include time length, play, like, comment, favorite, forward, download, share, and the like.

As one possible implementation, the electronic device can firstly analyze time lengths of all video materials posted by a user within the preset time period, determine a video material with an overall time length greater than a first preset time length as a candidate video material, and obtain a candidate video material collection; and then, perform a weighting calculation on information of each candidate video material in the candidate video material collection in one or more first dimensions such as play, like, comment, favorite, forward, download, share, and the like, respectively, to obtain a comprehensive score corresponding to each candidate video material respectively, sort the comprehensive scores corresponding to each of the candidate video materials, and determine a plurality of candidate video materials with comprehensive scores meeting a preset condition as video materials for generating a target video corresponding to the preset time period.

Illustratively, for each video material already posted within a preset time period, amount of likes $X1$, amount of comments $X2$, amount of favorites $X3$ and amount of forwards $X4$ of the video material are acquired, wherein a weight corresponding to the like dimension is $s1$, a weight corresponding to the comments dimension is s2, a weight corresponding to the favorites dimension is s3, and a weight corresponding to the forwards dimension is s4. A weighting calculation is performed based on the information and weight corresponding to each dimension, to obtain a weighting calculation result corresponding to the video material, where the above weighting calculation can be expressed by a formula as follows: P=s1×X1+s2×X2+s3×X3+s4×X4, where P represents the weighting calculation result corresponding to the video material.

A higher numerical value of the weighting calculation result indicates a higher probability that the posted video material meets a particular condition for selecting a video material, while a lower numerical value of the weighting calculation result indicates a lower probability that the posted video meets a particular condition for selecting a video material.

It should be noted that, before the weighting calculation is performed, the purpose of screening the video material already posted by the user within the preset time period based on the first preset time length is to ensure that the video material with stronger content can be obtained. If the time length of the video material is too short, there is relatively less video content. It is impossible to segment the video material into effective video segments for generating the target video or match with the time lengths of the musical phrases of the soundtrack.

The first preset time length can be determined according to a minimum time length corresponding to the target video segment. For example, if the minimum time length of the target video segment is 2 s, the first preset time length can be greater than 2 s, e.g., the first preset time length is 3 s, 4 s, or the like.

It should be noted that, the present disclosure makes no limitation on the number of video materials for generating the target video corresponding to the preset time period. For example, the number of video materials for generating the target video corresponding to the preset time period can be a fixed numerical value or any numerical value within a preset numerical value range, which can be decided according to the total amount of the video materials posted by the user within the preset time period. Illustratively, the number of video materials for generating the target video corresponding to the preset time period can be set to 5, 10, or the like, or any number of [3, 10] at the electronic device.

In addition, when the electronic device selects a plurality of video materials from the initial video material collection, it is also possible to perform exclusion on videos of other people forwarded by the user, videos set by the user to be in a private state, videos deleted after being posted by the user, videos of advertising promotion and the like, and then perform screening based on the time length of the video material and the information of the video material in the first dimensions, so as to protect the privacy of the user and ensure that the content of the generated target video corresponding to the preset time period is closely related to the memories of the user within the preset time period.

S202, acquiring a target audio material serving as background music.

In some cases, if the time length of the target audio material, an audio feature in other dimension than the time length of the target audio material, and the like meet the requirements of being the background music of the target video in the present application, and then there is no need to perform special processing on the target audio material; in some other cases, if the time length of the target audio material, the audio features of some audio segments in the target audio material, and the like do not meet the requirements of being the background music of the target video in the present application, then a target audio segment meeting the condition can be extracted from the target audio material as the background music of the target video.

If the target audio segment in the target audio material serves as the background music of the target video, the target audio segment can be a particular audio segment in the target audio material which is determined by the electronic device by comprehensively analyzing audio features of the audio materials in the second dimension in the preset audio material collection.

The preset audio material collection can include audio materials added to favorites by the user, audio materials used by the user to post videos, audio materials in an audio library, and the like. The present disclosure makes no limitation on the number of audio materials, the time lengths of the audio materials, the storage formats of the audio materials, and other parameters of audio materials comprised in the preset audio material collection.

The second dimension can include one or more dimensions such as tempo, audio style, audio emotion, audio scenario, time lengths of musical phrases, and number of times an audio is used to post a video. Certainly, the second dimension can also include features of the audio material in other dimensions, and the present disclosure makes no limitation on which dimensions of features are specifically included in the audio features.

The target audio material and the target audio segment can also be an audio that is determined by the electronic device in other manner. Hereinafter, how to determine the target audio material and the target audio segment will be introduced in detail in the embodiment shown in FIG. 3.

S203, for each of the video materials, performing image feature extraction on video frames of the video material respectively, and performing segmentation processing according to image feature information corresponding to the video frames of the video material respectively to acquire a target video segment corresponding to the video material.

The plurality of video materials involved in this step are the plurality of video materials acquired from the initial video material collection in step S201.

The electronic device can adopt a pre-trained video processing model to perform feature extraction on video frames of the selected plurality of video materials in a third dimension to obtain image feature information output by the video processing model for the video frames in the video materials; obtain an evaluation result corresponding to the video frame based on the image feature information corresponding to the video frames in the video materials; and determine a position of the target video segment to be segmented in the video material based on the evaluation results corresponding to the video frames respectively, the sentence segmentation result of the initial audio of the video material, and the time length of the corresponding musical phrase in the target audio segment, and then perform segmentation so as to obtain the target video segment.

The above third dimension can include one or more dimensions of image style, image scenario, image theme, image emotion, image character relationship, image significance feature, and the like. Furthermore, the present disclosure makes no limitation on the type of the video processing model. For example, the video processing model can be a neural network model, a convolution model, or the like.

Based on the evaluation results corresponding to the video frames respectively, the sentence segmentation result of the initial audio of the video material, and the time length of the corresponding musical phrase in the target audio segment, the target video segment can be acquired by adopting (but not limited to) any one of the following implementations:

in one possible implementation, assuming that the evaluation result is a numerical value, the electronic device can analyze a video frame range where video frames with higher values of the evaluation result are relatively numerical concentrated, wherein the video frame range can be set to be equal to or exceed a preset maximum time length of each video segment in the generated target video; and then, perform segment extraction within the above determined video frame range based on the sentence segmentation result for the initial audio of the video material to obtain a target video segment, so that the initial audio segment corresponding to the target video segment includes one or more complete sentences.

In another possible implementation, assuming that the evaluation result is a numerical value, the electronic device can further perform a search around the position where the video frame with the highest numerical value of the evaluation result is located, according to the position where the video frame with the highest numerical value of the comprehensive result is located, to obtain the target video segment, so that the initial audio segment corresponding to the target video segment includes one or more complete sentences.

It should be noted that the time length of the target video segment determined in any one of the above manners can be less than the time length of the corresponding musical phrase in the target audio segment. Illustratively, assuming that the above first implementation is currently executed for the video material 2, if a video frame range with a higher numerical value relative to the evaluation result is determined as the 15th frame to the 26th frame of the video material according to the evaluation result corresponding to the video frame, the playing speed is 3 frames per second, and the playing time length is 4 s, then in an initial audio corresponding to the video material 2, the initial audio segment corresponding to the 15th frame to the 26th frame includes 2 complete sentences, assuming that both the time lengths of the 1st sentence and the 2nd sentence are 2 s; while the playing time length corresponding to the video material 2 is the time length of the 2nd musical phrase in the target audio segment, namely 3 s, and at most 9 frames can be played at the speed of 3 frames per second. Therefore, 9 or less continuous video frames need to be extracted from the 15th frame to the 26th frame. Then, according to the overall distribution of the numerical values of the evaluation results of the plurality of video frames corresponding to the two sentences respectively or the video frame with the highest numerical value of the evaluation result, the plurality of video frames corresponding to one of the sentences can be determined as the video frames included in the target audio segment to be extracted.

Illustratively, assuming that above the second implementation is currently executed for the video material 3, if a video frame with the highest numerical value relative to the evaluation result is determined as the 20th frame according to the evaluation result corresponding to the video frames, and in the initial audio corresponding to the video material 3, the time length of the sentence corresponding to the 20th frame is 4 s, with the time length of a last sentence being 2 s, and the time length of a next sentence being 2 s; while the playing time length corresponding to the video material 3 is the time length of the 3rd musical phrase in the target audio segment, namely 8 s. Therefore, a forward search and a backward search are performed on the 20th frame respectively to determine the sentence in the initial audio corresponding to the 20th frame, the last sentence, and the next sentence, and the plurality of video frames corresponding to one of these sentences are determined as the video frames included in the target audio segment to be extracted.

The electronic device can execute this process on each of the video materials described above so as to extract the corresponding target video segment from the selected video material.

It should be noted that the electronic device can also extract the target video segment from the video material in other manner.

S204, merging the plurality of target video segments and the target audio material to generate a target video; wherein the target video comprises a plurality of video segments which are obtained based on the plurality of target video segments respectively; the plurality of video segments in the target video are played in order of post time, and time lengths of the plurality of video segments are matched with time lengths of corresponding musical phrases in the target audio material.

The plurality of target video segments include target video segments corresponding to each of the video materials.

As one possible implementation, the electronic device can fill a plurality of target video segments into a clip template in order of post time, and then merge the plurality of target video segments with the target audio material (or the target audio segments of the target audio material), so as to generate the target video. The clip template is used for indicating a clip operating mode corresponding to one or more clip types which include, for example, one or more of transition, filter, effect and the like.

In the merging process, the time length of the target video segment is possibly greater than or less than the time length of the corresponding musical phrase, and in this case, the playing speed of the target video segment can be increased or decreased, so that the time length of the target video segment with the adjusted playing speed is matched with the time length of the corresponding musical phrase. Then, the video segment included in the target video is the above target video segment with the adjusted playing speed.

In addition, in each video frame of each target video segment in the target video, information related to the target video segment, for example, the post time of the target video segment, the post place of the target video segment, the title of the target video segment when posted by the user, whether the target video segment is an on-beat type of video, and the like, can be displayed. The information related to the target video segment can be displayed at any position of the video frame, for example, the upper left corner, the upper right corner, the lower left corner, the lower right corner and the like, so that the picture of the target video frame can be unshielded as much as possible, and the visual experience of the user can be ensured.

According to the method provided by the present embodiment, by selecting a plurality of video materials from user-related videos, extracting some target video segments from the selected plurality of video materials, merging the extracted target video segments with the determined target audio material thereby to generate the target video, through which the user can review past profound memories; and matching the time length of each video segment in the target video with the time length of the musical phrase in the adopted target audio material, so that the content tempo of the target video is matched with the audio tempo, a unique experience and feeling can be brought to the user.

Figure 3:
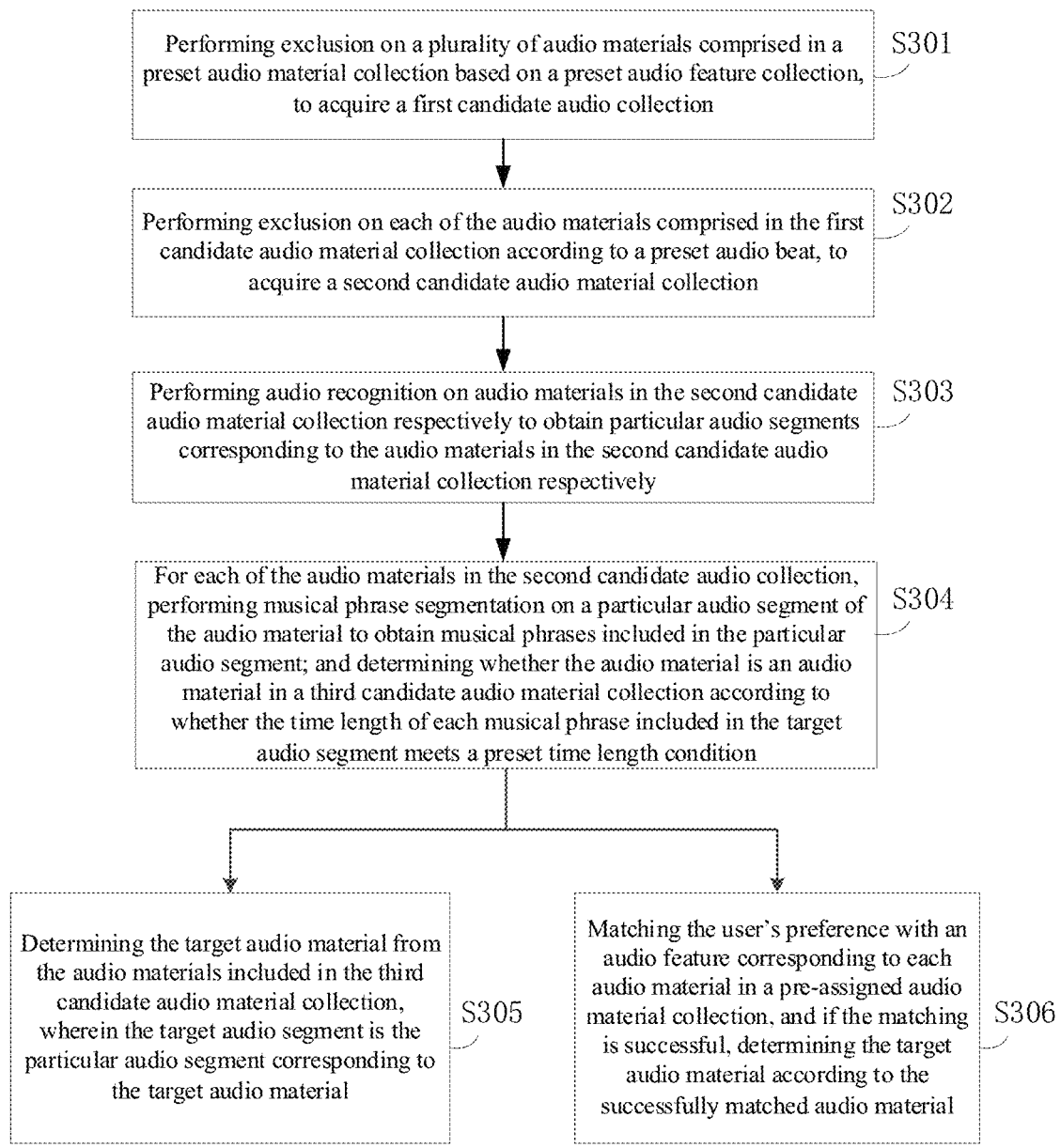
FIG. 3 is a schematic flow diagram of a video generating method provided by another embodiment of the present disclosure.

FIG. 3 is a flow diagram of a video generating method provided by another embodiment of the present disclosure. The embodiment shown in FIG. 3 is primarily used to introduce an implementation of determining the target audio material and the target audio segments. Referring to FIG. 3, the method of the present embodiment includes:

S301, performing exclusion on a plurality of audio materials comprised in a preset audio material collection based on a preset audio feature collection to acquire a first candidate audio collection.

The step S301 is equivalent to screening audios in dimensions of audio style tag, audio emotion tag, audio language tag, and audio scenario tag, and the like.

The preset audio material collection can include a plurality of audio materials in an audio library, audio materials added to favorites by a user, audio materials used in the videos which have been posted by the user, and the like. The present disclosure makes no limitation on the implementation of determining the preset audio material collection. The electronic device can acquire an identification of each audio material in the preset audio material collection, audio feature information of the audio material, lyric information of the audio material and the like, wherein the identification of the audio material can uniquely identify the audio material, which facilitates a follow-up search in the preset audio material collection according to the identification of the determined target audio material, and the identification of the audio material can be, for example, an audio material ID, a digital number and the like.

The audio features included in the preset audio feature collection are audio features of the audio material not recommended as the soundtrack of the target video in different dimensions. For example, the preset audio feature collection can include audio features in one or more dimensions, such as audio style feature, audio emotion feature, audio language feature, audio scenario feature, and the like. Certainly, the preset audio feature collection can also include audio features of other dimensions, which are not limited in the present disclosure. Illustratively, the preset audio feature collection includes: stress, anger, fatigue and other audio emotion features.

In the process that the electronic device performs exclusion on the audio materials in the preset audio material collection according to the preset audio feature collection, the music feature corresponding to each audio material can be matched with each audio feature in the preset audio feature collection. If the matching is successful, it is determined that the audio material is a non-candidate audio; and if the matching is not successful, it is determined that the audio material is a candidate audio material, thereby obtaining a first candidate audio material collection.

The first candidate audio material collection can include a plurality of candidate audio materials.

S302, performing exclusion on each of the audio materials comprised in the first candidate audio material collection according to a preset audio beat, to acquire a second candidate audio material collection.

The step S302 is equivalent to screening the audio materials in dimension of audio tempo.

The audio beat can be represented by a number of beats per minute, i.e. Beat Per Minute (BPM), which can be used to measure how fast the audio or sound tempo is, and a higher value of BPM indicates a faster tempo.

The electronic device can acquire the BPM corresponding to each audio material in the first candidate audio material collection, and then compare the BPM corresponding to the audio material with the preset audio beat. The audio material meeting the preset audio beat is an audio material in the second candidate audio material collection, and the audio material not meeting the preset audio beat is the excluded audio material which is not possible to become the soundtrack of the target video.

The preset audio beat can be a BPM range, e.g., BPM= [80, 130].

It should be noted that the order to execute the above S301 and S302 is not sequential, and it is also possible to execute S302 before S301.

Next, the electronic device can determine the target audio material according to the audio material, in which a time length of each of musical phrases included in a particular audio segment meets a preset time length condition, in the second candidate audio material collection. Illustratively, step S303 to step S305 can be included for implementation.

S303, performing audio recognition on audio materials in the second candidate audio material collection respectively to obtain particular audio segments corresponding to the audio materials in the second candidate audio material collection respectively.

S304, for each audio material in the second candidate audio collection, performing musical phrase segmentation on a particular audio segment of the audio material to obtain musical phrases included in the particular audio segment; and determining whether the audio material is an audio material in a third candidate audio material collection according to whether the time length of each of the musical phrases included in the target audio segment meets a preset time length condition.

The steps S303 and S304 are equivalent to screening the audio materials in dimension of the time length of the musical phrase, and the screening is performed based on the time length of the musical phrase included in a particular audio segment of the audio material.

The particular audio segment can be understood as a climax audio segment in the audio material. The present disclosure makes no limitation on the implementation of acquiring a corresponding particular audio segment from an audio material. For example, a particular audio segment can be an audio segment obtained by an audio processing module analyzing a particular attribute of an audio material, which can be combined with a number of video materials for generating the target video corresponding to the preset time period, and segmenting the target audio. The present disclosure makes no limitation on the type of the audio processing model. For example, the audio processing model can be a neural network model, a convolution model, or the like.

After audio processing is performed on each of the audio materials in the second candidate audio material collection respectively to obtain a particular audio segment corresponding to each of the audio materials in the second candidate audio material collection, the Voice Activity Detection (VAD) technology can be used to analyze lyrics of the particular audio segment, determine a start position and an end position of the lyrics of each musical phrase in the particular audio segment, that is, determine a boundary of the lyrics corresponding to each musical phrase, and map the start position and the end position of the lyrics of each musical phrase to the particular audio segment, so as to obtain the time length of each musical phrase.

If the time length of each of the musical phrases of the target audio segment meets a second preset condition (for example, a preset requirement on time length), the audio material to which the particular audio segment belongs is determined as the audio material in the third candidate audio material collection; and if the time length of one or more musical phrases of the particular audio segment does not meet the second preset condition, the audio material to which the particular audio segment belongs is determined as the excluded audio material.

It should be noted that the second preset condition (e.g., the preset requirement on time length) can be determined according to the minimum time length and the maximum time length of a single video segment allowed in the target video. For example, in the target video, the shortest video segment is 2 s, and the longest video segment is 5 s, then the second preset condition can be greater than or equal to 3 s and less than or equal to 6 s; the reservation of a time margin of 1 s can be used for transition, and can also avoid the occurrence of an error when the video segments are subsequently merged.

In a possible case, one or more audio materials in the second candidate audio material collection meet a condition, and thus the third candidate audio material collection includes one or more audio materials, then the target audio material can be determined from the audio materials included in the third candidate audio material collection. In this case, the electronic device can perform S305.

In another possible case, all the audio materials in the second candidate audio material collection do not meet the second preset condition, and thus there is no audio material in the third candidate audio material collection, then it is impossible to determine the target audio material from the third candidate audio material collection. In this case, the electronic device can perform S306.

S305, determining the target audio material from the audio materials included in the third candidate audio material collection, wherein the target audio segment is a particular audio segment corresponding to the target audio material.

In one possible implementation, the electronic device can perform a weighting calculation on the audio materials in the third candidate audio material collection based on the total amount of videos posted by using the audio material, amount of favorites of audio materials, the number of videos posted by the target user by using the audio material, and other information, sort the audio materials in the third candidate audio material collection in order from high to low based on the weighting calculation results, and select the audio material ranked first as the target audio material based on the sorting result.

In another possible implementation, the electronic device can randomly select one audio material from the third candidate audio material collection as the target audio material.

Certainly, the electronic device can also select the target audio material from the third candidate audio section in other manner, and the present disclosure makes no limitation on the implementation of how to select the target audio material from the third candidate audio collection.

It should be noted that, sorting on the plurality of candidate audios based on the total amount of videos posted by using the audio, amount of favorites of the audios, the number of videos posted by the target user by using the audios, and other information can also be executed after steps S301 and S302 and before step S303, then in the process of executing steps S303 to S305, the operations can be performed in order of the sorted candidate audios.

S306, matching the user's preference with an audio feature corresponding to each of the audio materials in a pre-assigned audio material collection, and if the matching is successful, determining the target audio material according to the successfully matched audio material.

If the user's preference is successfully matched with the audio feature(s) of one or more audio materials in the pre-assigned audio material collection, then one of the one or more successfully matched audio materials can be determined as the target audio material.

For example, a weighting calculation can be performed in accordance with the total amount of videos posted by using the audio material, the amount of favorites of the audio material, the number of videos posted by the target user by using the audio material, and other information, perform sorting on the successfully matched audio materials in order from high to low based on the weighting calculation results, and select the audio material ranked first as the target audio material; alternatively, it is also possible to randomly select one of the successfully matched audio materials as the target audio material.

If the user's preference is not matched with the audio feature of the preset audio, one audio material can be randomly selected from the preset audio material collection or the pre-assigned audio material collection as the target audio material.

By selecting a target audio material according to the method provided by the embodiment, the selected target audio material can be matched with a plurality of target video segments extracted from a plurality of video materials posted by a user within a preset time period. By using the selected target audio material as background music of the target video, the target video can meet the user expectation as far as possible, and the user experience can be improved.

An opening and ending of a video are important parts of the video, which can improve the extent of impressiveness of the video. Therefore, how to generate the opening and ending of the target video is introduced in detail in the embodiment shown in FIG. 4.

Figure 4:
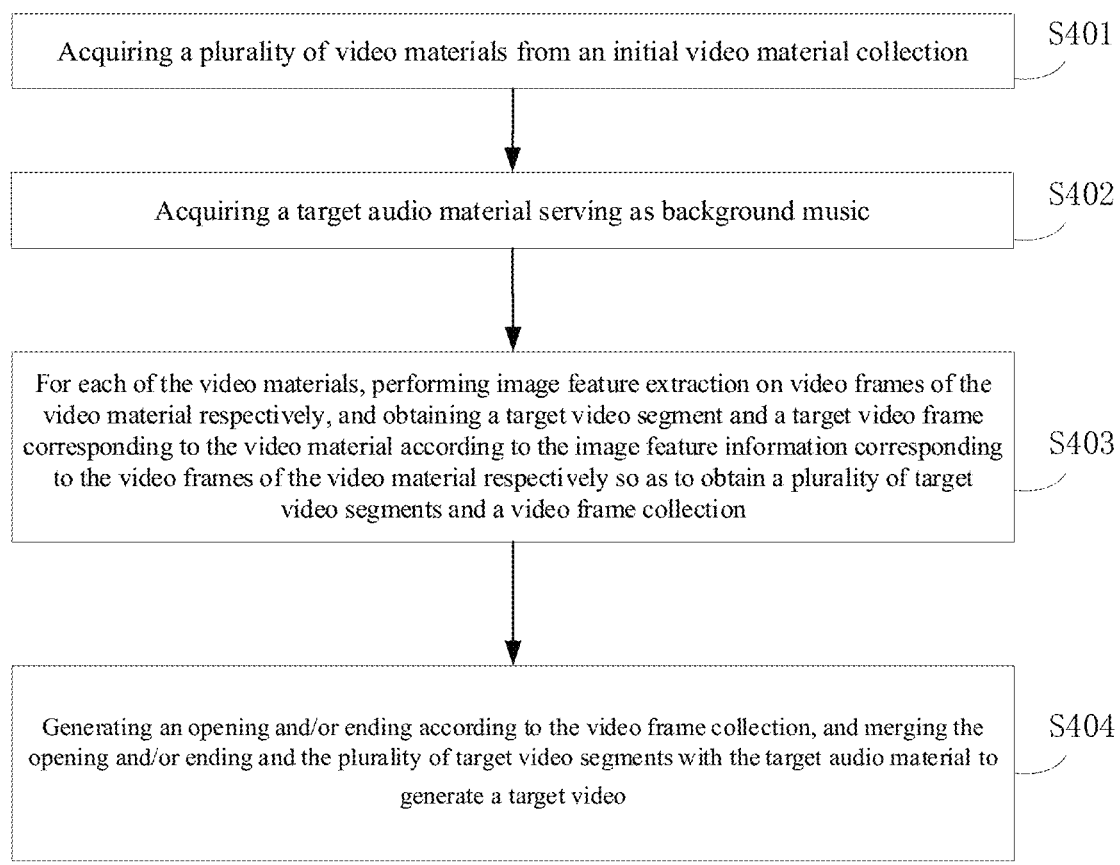
FIG. 4 is a schematic flow diagram of a video generating method provided by another embodiment of the present disclosure.

FIG. 4 is a flow diagram of a video generating method provided by another embodiment of the present disclosure. Referring to FIG. 4, the method provided by the present embodiment includes:

S401, acquiring a plurality of video materials from an initial video material collection.

The initial video material collection includes video materials posted by a user within a preset time period, and a plurality of video materials selected from the initial video material collection are used for generating a target video corresponding to the preset time period.

S402, acquiring target a audio material serving as background music.

In the present embodiment, steps S401 and S402 are similar to steps S201 and S202 in the embodiment shown in FIG. 2 respectively, and reference can be made to the detailed description of the embodiment shown in FIG. 2, which is not repeated herein for brevity.

It should be noted that, since the target video includes an opening and ending, when determining the target audio material, not only the time length of the target video segment but also the necessity of respectively corresponding the opening and ending to a time length of one musical phrase need to be considered, so that the consistency of the overall structure of the target video can be ensured, that is, each of the video segments in the target video is ensured to be matched with the time length of a complete musical phrase.

S403, for each of the video materials, performing image feature extraction on each of video frames of the video material respectively, and obtaining a target video segment and a target video frame corresponding to the video material according to the image feature information corresponding to each of the video frames of the video material respectively so as to obtain a plurality of target video segments and a video frame collection.

The video frame collection includes target video frames extracted from the video materials, and the plurality of target video frames included in the video frame collection are used for generating an opening and/or ending of a target video.

The implementation of performing image feature extraction of the video frames for the plurality of video materials respectively, and performing segmentation processing according to the image feature information corresponding to each of the video frames to acquire a target video segment can refer to the detailed description of the embodiment shown in FIG. 2, and for the sake of brevity, details are not repeated here.

The target video frames included in the video frame collection are image materials for generating the opening and/or ending of the target video. It is mainly introduced here how to obtain target video frames included in the video frame collection.

As one possible implementation, the target video frame can be a video frame extracted from a target video segment corresponding to the video material, and the image feature information of the target video frame meets a condition.

Illustratively, in combination with the foregoing, when determining the target video segment, an evaluation result corresponding to each of the video frames of the video material can be obtained based on the image feature information of each of the video frames in the video material. Assuming that the evaluation result is a numerical value, the electronic device can use a video frame with the highest numerical value of the evaluation result in the target video segment as the image material for generating the opening and/or ending. Alternatively, the electronic device can also select one video frame from a plurality of top-ranking video frames of the video frames in the target video segment, which are sorted in order from a high numerical value to a low numerical value of the evaluation result, as the image material for generating the opening and/or ending.

By executing the above process for each of the video materials, a video frame meeting the condition can be obtained from each of the video materials as an image material for generating the opening and/or ending of a target video, that is, a video frame collection is obtained.

S404, generating the opening and/or ending according to the video frame collection, and merging the opening and/or ending and the plurality of target video segments with the target audio material to generate a target video.

The target video includes an opening, a plurality of video segments obtained based on the plurality of target video segments respectively, and an ending. The plurality of video segments in the target video are played in order of post time, and the time lengths of the plurality of video segments are matched with the time lengths of corresponding musical phrases in the target audio material.

Assuming that background music of a target video is a target audio segment in a target audio material, then the time length of an opening is matched with the time length of a first musical phrase of the target audio segment, the time length of an ending is matched with the time length of a last musical phrase of the target audio segment, the time length of each of the target video segments is matched with the time length of a corresponding musical phrase, i.e., the time length of a 1st target video segment is matched with the time length of a 2nd musical phrase in the target audio segment, the time length of a 2nd target video segment is matched with the time length of a 3rd musical phrase in the target audio segment, the time length of a 3rd target audio segment is matched with the time length of a 4th musical phrase in the target audio segment, and so on.

As a possible implementation, assuming that an opening and ending need to be generated, the electronic device can clip a plurality of target video frames included in the video frame collection through different clip templates, respectively, to obtain the opening and ending. The clip template is used for indicating a clip mode of clipping target video frames included in the video frame collection into video segments, for example, the clip mode includes, but is not limited to, one or more of transition mode, effect, filter, and the like. The present disclosure makes no limitation on the clip templates.

Since the time length of the opening needs to be matched with the time length of the first musical phrase of the target audio segment, and the time length of the ending needs to be matched with the time length of the last musical phrase of the target audio segment, a clip template for clipping the opening can be selected according to the time length of the first musical phrase of the target audio segment, and a clip template for clipping the ending can be selected according to the time length of the last musical phrase of the target audio segment. Certainly, other factors can also be considered in selecting the clip template, such as the style of the video segment generated based on the clip template, the requirements of the clip template for the image material, and the like.

It should be noted that, in the merging process, it is possible that a time length of the target video segment is greater than or less than a time length of the corresponding musical phrase, and then the playing speed of the target video segment can be increased or decreased, so that the target video segment with the adjusted playing speed is matched with the time length of the corresponding musical phrase.

By extracting video frames respectively from the plurality of target video segments to generate an opening and ending of the target video, the present embodiment makes the target video even more wonderful, enables the target video to meet the user expectation as far as possible, improves the user experience, and is advantageous in increasing interest of the user in posting the video.

In a specific embodiment, assuming that the video generating method is executed by a server device which specifically includes: a business server, an audio algorithm server, an image algorithm server, and a cloud service for executing a merging process. The service device can pre-generate a target video corresponding to a preset time period (for example, a past year) offline, and when the business server receives a video acquisition request sent by the client, the target video corresponding to the preset time period (for example, a past year) is sent to the client.

Figure 5:
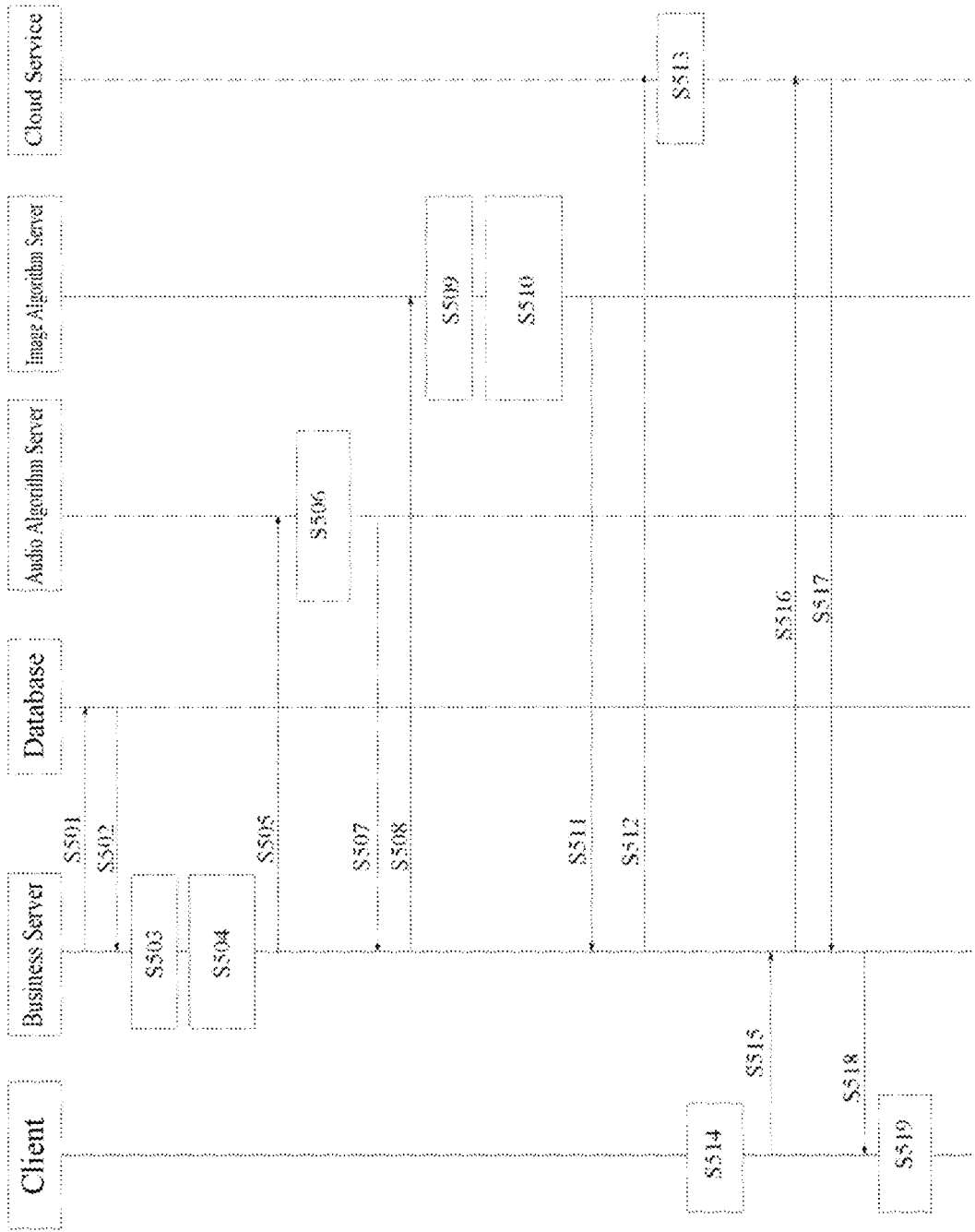
FIG. 5 is a schematic flow diagram of a video generating method provided by another embodiment of the present disclosure.

How the server pre-generates the target video will be introduced in detail by an embodiment shown in FIG. 5. The embodiment shown in FIG. 5 shows a specific flow of the video generating method in the above scenario.

Referring to FIG. 5, the present embodiment includes:

S501, a business server sends a video material acquisition request to a database.

The video material acquisition request is used for requesting videos posted by a target user within a preset time period. The video material acquisition request can include an identification of the target user and instructing information for instructing to request acquisition of the video materials posted by the target user within the preset time period.

S502, the database sends to the business server an initial video material collection corresponding to a target user.

S503, the business server determines a plurality of video materials from the initial video material collection corresponding to the target user.

S504, the business server performs exclusion on a preset audio material collection based on a preset audio feature collection and a preset audio beat, to obtain a second candidate audio material collection.

S505, the business server sends to the audio algorithm server an identification of each of the audio materials included in the second candidate audio material collection.

S506, the audio algorithm server downloads an audio material according to the received identification of the audio material, performs particular audio segment recognition, musical phrase segmentation and screening on the audio material, and determines a target audio material.

S507, the audio algorithm server sends to the business server an identification of the target audio material and audio timestamp information.

The audio timestamp information includes timestamp information of each musical phrase in a target audio segment in the target audio material, and a start time and an end time of each musical phrase in each target audio segment can be determined through the audio timestamp information, so that the time length information of each musical phrase can be obtained.

S508, the business server sends to an image algorithm server the identifications of the plurality of video materials, the identification of the target audio material, and the audio timestamp information.

S509, the image algorithm server acquires the plurality of video materials and the target audio material according to the identifications of the plurality of video materials and the identification of the target audio material.

S510, the image algorithm server obtains respective timestamp information of a plurality of target video segments and video merging logic between the plurality of target video segments and the target audio segment according to the plurality of video materials, the target audio material and the audio timestamp information.

S511, the image algorithm server sends to the business server the respective timestamp information of the plurality of target video segments and the video merging logic between the plurality of target video segments and the target audio segment.

S512, the business server sends to a cloud service the identifications of the plurality of video materials, the respective timestamp information of the plurality of target video segments, the identification of the target audio material, the timestamp information of the target audio segment, and the video merging logic between the plurality of target video segments and the target audio segment.

S513, the cloud service performs video merging according to the identifications of the plurality of video materials, the respective timestamp information of the plurality of target video segments, the identification of the target audio material, the timestamp information of the target audio segment, and the video merging logic between the plurality of target video segments and the target audio segment, to generate a target video.

The generated target video can be stored at a cloud service.

S514, the client receives a video acquisition request sent by a user.

S515, the client sends the video acquisition request to the business server.

S516, the business server sends the video acquisition request to the cloud service.

S517, the cloud service sends the target video to the business server.

S518, the business server sends the target video to the client.

S519, the client loads the target video to a video editing page for playing.

After that, the client can clip and post the target video based on the user's operation.

In the embodiment shown in FIG. 5, the detailed descriptions of the foregoing method embodiments can be referred to for the implementations of the audio algorithm server and the image algorithm server, and for brevity, no repeated description is provided in the present embodiment.

According to the method provided by the present embodiment, by selecting a plurality of video materials from the video materials posted by the user within the preset time period, extracting some target video segments from the selected plurality of video materials, merging the extracted target video segments with the determined target audio segment thereby to generate the target video corresponding to the preset time period, so that the user can review profound memories within the preset time period through the target video; and matching the time length of each of the video segments in the target video with the time length of the musical phrase in the adopted target audio segment, so that the content tempo of the target video is matched with the audio tempo, a unique experience and feeling can be brought to the user. Moreover, the solution is completed offline by the client in advance, so the server device can quickly respond to the video acquisition request once receiving the video acquisition request sent by the client, so that the user experience is ensured.

Illustratively, the present disclosure also provides a video generating apparatus.

Figure 6:
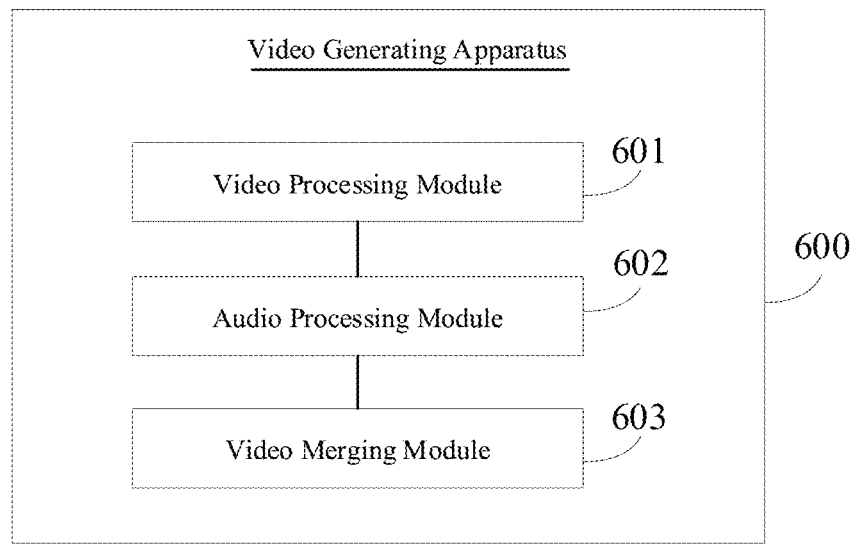
FIG. 6 is a schematic structural diagram of a video generating apparatus provided by one embodiment of the present disclosure.

FIG. 6 is a schematic structural diagram of a video generating apparatus provided by one embodiment of the present disclosure. The video generating apparatus provided by the present embodiment can be a video generating system. Referring to FIG. 6, the video generating apparatus 600 can include: a video processing module 601, an audio processing module 602, and a video merging module 603.

The video processing module 601 is used for acquiring a plurality of video materials from an initial video material collection which includes user-related videos.

The audio processing module 602 is used for acquiring a target audio material serving as background music.

The video processing module 601 is further used for performing image feature extraction on the video frames of the video material respectively, and performing segmentation processing according to image feature information corresponding to the video frames of each of the video materials respectively, to acquire a target video segment corresponding to the video material.

The merging module 603 is used for merging the target video segment corresponding to the each video material respectively with the target audio material to generate a target video; wherein the target video comprises a plurality of video segments which are obtained based on the plurality of target video segments respectively; the plurality of video segments in the target video are played in order of post time;

time lengths of the plurality of video segments are matched with time lengths of corresponding musical phrases in the target audio material.

The video generating device provided by the present embodiment can be used for executing the technical solutions shown in any one of the foregoing method embodiments, with similar implementation principles and technical effects. For simplicity, reference may be made to the detailed description of the foregoing method embodiments.

As a possible implementation, the audio processing module 602 is specifically used for determining a target audio material from a preset audio material collection according to an audio feature of each of the audio materials in the preset audio material collection, beat information of the audio material, and a time length of each of the musical phrases of a particular audio segment in the audio material, wherein the particular audio segment in the target audio material is background music of the target video.

As a possible implementation, the audio processing module 602 is specifically used for performing exclusion on a plurality of music materials included in a preset music material collection according to a preset music feature collection, to obtain a first candidate audio material collection; performing exclusion on each of the audio materials included in the first candidate audio material collection according to a preset audio beat to obtain a second candidate audio material collection; and determining the target audio material according to the audio material, in which a time length of each of the musical phrases included in the particular audio segment meets a preset time length condition, in the second candidate audio material collection.

As a possible implementation, if there is no audio material, in which a time length of the musical phrase in the particular audio segment meets a preset time length condition, in the second candidate audio material collection, then the audio processing module 602 is further used for matching with an audio feature corresponding to each of audio materials respectively in a pre-assigned audio material collection according to the user's preference, and if the matching is successful, then determining a target audio material according to the successfully matched audio material.

As a possible implementation, the video processing module 601 is further used for performing, for each of the video materials, a weighting calculation according to image feature information corresponding to the video frames of the video material, to obtain evaluation results corresponding to the video frames;

according to the evaluation results corresponding to the video frames, extracting a target video frame from the video frames of the video material to obtain a video frame collection, wherein the video frame collection includes a plurality of target video frames extracted from the plurality of video materials, and the video frame collection is used for generating an opening and/or ending of the target video.

Correspondingly, the merging module 603 is specifically used for merging a target video segment corresponding to each of the video materials respectively, the video frame collection, and the target audio segment, to generate the target video which includes an opening and/or ending generated according to the video frame collection.

As a possible implementation, the video processing module 601 is specifically used for performing segmentation processing on the video material according to image feature information corresponding to video frames of the video material respectively, a time length of a corresponding musical phrase in the target audio segment, and a sentence segmentation result of an initial audio in the video material, to obtain the target video segment.

As a possible implementation, the target audio segment includes one or more complete sentences in the corresponding initial audio.

As a possible implementation, the video generating apparatus 600 can further include: a storage module (not shown in FIG. 6), which is used for storing the generated target video.

As a possible implementation manner, if the video generating apparatus 600 is a server device, the video generating apparatus can further include: a communication module (not shown in FIG. 6), which is used for receiving a video acquisition request sent by the client, and sending, to the client, a target video corresponding to the corresponding preset time period in response to the video acquisition request.

It should be noted that details, which are not revealed in detail in the apparatus embodiments shown in FIG. 6, can refer to the description of the foregoing method embodiments, which are not introduced one by one in the apparatus embodiments for the sake of brevity.

Illustratively, the present disclosure also provides an electronic device.

Figure 7:
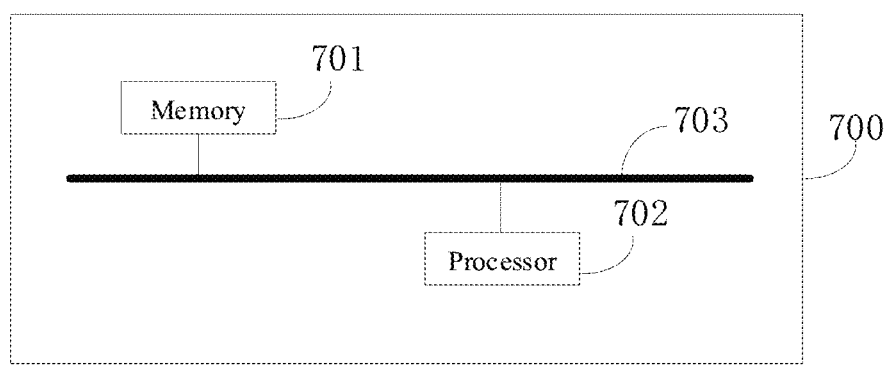
FIG. 7 is a schematic structural diagram of an electronic device provided by one embodiment of the present disclosure.

FIG. 7 is a schematic structural diagram of an electronic device provided by one embodiment of the present disclosure. Referring to FIG. 7, the electronic device 700 provided by the present embodiment includes: a memory 701 and a processor 702.

The memory 701 can be a separate physical unit, and can be connected to the processor 702 via a bus 703. The memory 701 and the processor 702 can also be integrated together and implemented by hardware, etc.

The memory 701 is used for storing program instructions, and the processor 702 calls the program instructions to execute the technical solution of any one of the above method embodiments.

Optionally, when part or all of the method of the above embodiments is implemented by software, the above electronic device 700 can also include only the processor 702. The memory 701 for storing programs is located outside the electronic device 700, and the processor 702 is connected to the memory via circuits/wires for reading and executing the programs stored in the memory.

The processor 702 can be a Central Processing Unit (CPU), a Network Processor (NP), or a combination of the CPU and the NP.

The processor 702 can further include a hardware chip. The above hardware chip can be an application-specific integrated circuit (ASIC), a programmable logic device (PLD), or a combination thereof. The above PLD can be a complex programmable logic device (CPLD), a field-programmable gate array (FPGA), a generic array logic (GAL), or any combination thereof.

The memory 701 can include a volatile memory, such as a random-access memory (RAM); the memory can also include a non-volatile memory, such as a flash memory, a hard disk drive (HDD) or a solid-state drive (SSD); the memory can also include a combination of the above kinds of memories.

The present disclosure also provides a readable storage medium including: computer program instructions which, when executed by at least one processor of the electronic device, implement the video generating method as shown in any one of the method embodiments described above.

The present disclosure also provides a computer program product which, when executed by a computer, causes the computer to implement the video generating method as shown in any one of the method embodiments described above.

It should be noted that, in this document, relational terms such as "first" and "second," and the like, are used solely to distinguish one entity or operation from another entity or operation without necessarily requiring or implying any such actual relationship or order between these entities or operations. Also, the terms "includes" "including" or any other variation thereof, are intended to cover a non-exclusive inclusion, such that a process, method, article, or device including a series of elements not only includes those elements but also includes other elements which not expressly listed or elements inherent to such process, method, article, or device. Without further limitation, an element defined by the phrase "including an . . . " does not exclude the presence of other identical elements in the process, method, article, or device including the element.

The above description is only particular embodiments of the present disclosure, which enable those skilled in the art to understand or implement the present disclosure. Various modifications to these embodiments will be obvious to those skilled in the art, and the generic principles defined herein may be applied to other embodiments without departing from the spirit or scope of the present disclosure. Thus, the present disclosure will not be limited to these embodiments shown herein but is to comply with the widest scope consistent with the principles and novel features disclosed herein.

What is claimed is:

1. A video generating method, comprising:
   acquiring a plurality of video materials from an initial video material collection which comprises user-related videos;
   acquiring a target audio material serving as background music;
   for each of the video materials, performing image feature extraction on video frames of the video material respectively, and performing segmentation processing according to image feature information corresponding to the video frames of the video material respectively to acquire a target video segment corresponding to the video material;
   merging the target video segment corresponding to each of the video materials respectively and the target audio material to generate a target video; the target video comprises a plurality of video segments which are obtained based on the plurality of target video segments respectively; the plurality of video segments in the target video are played in order of post time, and time lengths of the plurality of video segments are matched with time lengths of corresponding musical phrases in the target audio material,
   wherein, the acquiring a target audio material serving as background music comprises:
      determining the target audio material according to an audio material, in which time length of each musical phrase comprised in a particular audio segment of the audio material meets a preset time length condition, in a second candidate audio material collection; and
      if there is no audio material, in which the time length of the musical phrase in the particular audio segment meets a preset time length condition, in the second candidate audio material collection, matching with an audio feature corresponding to each of the audio materials in a pre-assigned audio material collection respectively according to preference of a user, and if the matching is successful, determining the target audio material according to the successfully matched audio material.

2. The method according to claim 1, wherein the particular audio segment in the target audio material is the background music of the target video.

3. The method according to claim 1, wherein, the second candidate audio material collection is obtained by:
   performing exclusion on a plurality of music materials comprised in a preset music material collection according to a preset music feature collection to acquire a first candidate audio material collection; and
   performing exclusion on each of the audio materials comprised in the first candidate audio material collection according to a preset audio beat to acquire the second candidate audio material collection.

4. The method according to claim 1, further comprising:
   for each of the video materials, performing a weighting calculation on image feature information corresponding to the video frames of the video material respectively, to acquire evaluation results corresponding to the video frames respectively;
   extracting a target video frame from the video frames of the video material according to the evaluation results corresponding to the video frames respectively to acquire a video frame collection, wherein the video frame collection comprises a plurality of target video frames extracted from the plurality of video materials, and the video frame collection is used for generating at least one of an opening or ending of the target video;
   the merging the target video segments corresponding to each of the video materials respectively and the target audio material to generate a target video comprising:
   merging target video segments corresponding to each of the video materials respectively, the video frame collection, and the target audio material to generate the target video which comprises at least one of an opening or ending generated according to the video frame collection.

5. The method according to claim 1, wherein, the performing segmentation processing according to image feature information corresponding to the video frames of each of the video materials respectively to acquire a target video segment comprises:
   performing segmentation processing on the video material according to image feature information corresponding to the video frames of the video material respectively, a time length of a corresponding musical phrase in the target audio segment, and a sentence segmentation result of the initial audio in the video material, to acquire the target video segment.

6. The method according to claim 5, wherein the target audio segment comprises one or more complete sentences in the corresponding initial audio.

7. An electronic device, comprising: a memory and a processor; wherein the memory is configured to store computer program instructions and the processor is configured to execute the computer program instructions to cause the electronic device to implement a video generating method comprising:
   acquiring a plurality of video materials from an initial video material collection which comprises user-related videos;
   acquiring a target audio material serving as background music;

for each of the video materials, performing image feature extraction on video frames of the video material respectively, and performing segmentation processing according to image feature information corresponding to the video frames of the video material respectively to acquire a target video segment corresponding to the video material; and merging the target video segment corresponding to each of the video materials respectively and the target audio material to generate a target video; the target video comprises a plurality of video segments which are obtained based on the plurality of target video segments respectively; the plurality of video segments in the target video are played in order of post time, and time lengths of the plurality of video segments are matched with time lengths of corresponding musical phrases in the target audio material, wherein the acquiring a target audio material serving as background music comprises:

determining the target audio material according to an audio material, in which time length of each musical phrase comprised in a particular audio segment of the audio material meets a preset time length condition, in a second candidate audio material collection; and if there is no audio material, in which the time length of the musical phrase in the particular audio segment meets a preset time length condition, in the second candidate audio material collection, matching with an audio feature corresponding to each of the audio materials in a pre-assigned audio material collection respectively according to preference of a user, and if the matching is successful, determining the target audio material according to the successfully matched audio material.

8. The electronic device according to claim 7, wherein the particular audio segment in the target audio material is the background music of the target video.

9. The electronic device according to claim 7, wherein, the second candidate audio material collection is obtained by:

performing exclusion on a plurality of music materials comprised in a preset music material collection according to a preset music feature collection to acquire a first candidate audio material collection; and performing exclusion on each of the audio materials comprised in the first candidate audio material collection according to a preset audio beat to acquire the second candidate audio material collection.

10. The electronic device according to claim 7, the processor is configured to execute the computer program instructions to further cause the electronic device to:

for each of the video materials, perform a weighting calculation on image feature information corresponding to the video frames of the video material respectively, to acquire evaluation results corresponding to the video frames respectively;

extract a target video frame from the video frames of the video material according to the evaluation results corresponding to the video frames respectively to acquire a video frame collection, wherein the video frame collection comprises a plurality of target video frames extracted from the plurality of video materials, and the video frame collection is used for generating at least one of an opening or ending of the target video;

the merging the target video segments corresponding to each of the video materials respectively and the target audio material to generate a target video comprising:

merging target video segments corresponding to each of the video materials respectively, the video frame collection, and the target audio material to generate the target video which comprises at least one of an opening or ending generated according to the video frame collection.

11. The electronic device according to claim 7, wherein, the performing segmentation processing according to image feature information corresponding to the video frames of the video material respectively to acquire a target video segment comprises:

performing segmentation processing on the video material according to image feature information corresponding to the video frames of the video material respectively, a time length of a corresponding musical phrase in the target audio segment, and a sentence segmentation result of the initial audio in the video material, to acquire the target video segment.

12. The electronic device according to claim 11, wherein the target audio segment comprises one or more complete sentences in the corresponding initial audio.

13. A non-transitory computer readable storage medium, comprising computer program instructions executable by at least one processor of an electronic device to cause the electronic device to implement a video generating method comprising:

acquiring a plurality of video materials from an initial video material collection which comprises user-related videos;

acquiring a target audio material serving as background music;

for each of the video materials, performing image feature extraction on video frames of the video material respectively, and performing segmentation processing according to image feature information corresponding to the video frames of the video material respectively to acquire a target video segment corresponding to the video material; and merging the target video segment corresponding to each of the video materials respectively and the target audio material to generate a target video; the target video comprises a plurality of video segments which are obtained based on the plurality of target video segments respectively; the plurality of video segments in the target video are played in order of post time, and time lengths of the plurality of video segments are matched with time lengths of corresponding musical phrases in the target audio material, wherein the acquiring a target audio material serving as background music comprises:

determining the target audio material according to an audio material, in which time length of each musical phrase comprised in a particular audio segment of the audio material meets a preset time length condition, in a second candidate audio material collection; and if there is no audio material, in which the time length of the musical phrase in the particular audio segment meets a preset time length condition, in the second candidate audio material collection, matching with an audio feature corresponding to each of the audio materials in a pre-assigned audio material collection respectively according to preference of a user, and if the matching is successful, determining the target audio material according to the successfully matched audio material.

14. The non-transitory computer readable storage medium according to claim 13, wherein the particular audio segment in the target audio material is the background music of the target video.

15. The non-transitory computer readable storage medium according to claim 13, wherein, the second candidate audio material collection is obtained by:
performing exclusion on a plurality of music materials comprised in a preset music material collection according to a preset music feature collection to acquire a first candidate audio material collection; and
performing exclusion on each of the audio materials comprised in the first candidate audio material collection according to a preset audio beat to acquire the second candidate audio material collection.

16. The non-transitory computer readable storage medium according to claim 13, wherein the at least one processor of an electronic device execute the computer program instructions to further cause the electronic device to implement:
for each of the video materials, performing a weighting calculation on image feature information corresponding to the video frames of the video material respectively, to acquire evaluation results corresponding to the video frames respectively;
extracting a target video frame from the video frames of the video material according to the evaluation results corresponding to the video frames respectively to acquire a video frame collection, wherein the video frame collection comprises a plurality of target video frames extracted from the plurality of video materials, and the video frame collection is used for generating at least one of an opening or ending of the target video;
the merging the target video segments corresponding to each of the video materials respectively and the target audio material to generate a target video comprising:
merging target video segments corresponding to each of the video materials respectively, the video frame collection, and the target audio material to generate the target video which comprises at least one of an opening or ending generated according to the video frame collection.

17. The non-transitory computer readable storage medium according to claim 13, wherein, the performing segmentation processing according to image feature information corresponding to the video frames of each of the video materials respectively to acquire a target video segment comprises:
performing segmentation processing on the video material according to image feature information corresponding to the video frames of the video material respectively, a time length of a corresponding musical phrase in the target audio segment, and a sentence segmentation result of the initial audio in the video material, to acquire the target video segment.

\* \* \* \* \*